(12) United States Patent
Katorgin et al.

(10) Patent No.: US 6,170,258 B1
(45) Date of Patent: Jan. 9, 2001

(54) LIQUID-PROPELLANT ROCKET ENGINE

(75) Inventors: Boris Ivanovich Katorgin; Vladimir Konstantinovich Chvanov; Felix Jurievich Chelkis; Vadim Lliich Semenov; Valentin Georgievich Polushin; Nina Ivanovna Murlykina, all of Khimki (RU)

(73) Assignees: Otkrytoe Aktsionernoe Obschestvo "Nauchno" Proizvodstvennoe Obiedinenie Energomash Imeni Akademika V.P. Glushko; Moskovskaya Oblast Moskovskaya Oblast Moskovskaya Oblast Khimki, Ulitsa Burdenko, d.1, both of (RU)

( * ) Notice: Under 35 U.S.C. 154(b), the term of this patent shall be extended for 0 days.

(21) Appl. No.: 09/391,154

(22) Filed: Sep. 8, 1999

(30) Foreign Application Priority Data

Jan. 21, 1999 (RU) ................................................ 99100660

(51) Int. Cl.$^7$ ...................................................... F02K 9/00
(52) U.S. Cl. .............................................................. 60/257
(58) Field of Search .............................. 60/257, 259, 263

(56) References Cited

U.S. PATENT DOCUMENTS 3,069,851 * 12/1962 Tumavicus .......................... 60/35.55

OTHER PUBLICATIONS

V.P. Glushko editor–in–chief, "Sovetskaya Entsiklopediya", 1985, pages in Encyclopedia under word Cosmonautics.
TsIam, Foreign Aircraft and Rocket Engines, 1971, pp. 436–439.

\* cited by examiner

*Primary Examiner*—Timothy S. Thorpe
*Assistant Examiner*—Ehud Gartenberg
(74) *Attorney, Agent, or Firm*—Banner & Witcoff, Ltd.

(57) ABSTRACT

The liquid-propellant rocket engine comprises two combustion chambers, a gas generator, a turbopump assembly, pipelines as well as a frame having footpads and supports located in different planes that are perpendicular to the engine axis, said frame being made up of at least two welded rod sections. Said sections are fastened to each other by a plane rod joint. The engine pipelines are connected to the combustion chambers and comprise bellows balances or flexible hoses which have their movable ends connected directly to the combustion chambers or to pipes joined thereto. The frame is made demountable due to the use of threaded connections that joint together the frame sections and the plane rod joint. The frame is made as a compensation frame by placing the footpad plane over the support plane. A curved pipe joint comprises a curved pipe, a hinge and a frame. At its end on the outlet side, the pipe is provided with a balance for compensating angular displacements, for instance, a bellows balance with a cardan mechanism. The curved pipe is connected to the frame by a hinge, and its outlet end is gas-tightly connected to the bellows of the balance.

10 Claims, 5 Drawing Sheets

LIQUID-PROPELLANT ROCKET ENGINE

FIELD OF THE INVENTION

The invention relates to rocket engineering and may be used in the production of rocket power plants based on the liquid propellant rocket engine.

BACKGROUND OF THE INVENTION

High-power liquid-propellant rocket engines are known in rocket engineering and they are widely used as parts of launchers designed for various purposes.

Known in the art under code name RD-253 is a liquid-propellant rocket engine (LRE) designed by the "Energomash" Scientific and Production Corporation (NPO Energomash) (see in the encyclopaedia: "Cosmonautics", Editor-in-Chief V. P. Glushko, Moscow, 1985, pp. 330–331). This LRE comprises a combustion chamber, a gas generator, a turbopump assembly, automatic equipment, pipelines that interconnect hydraulically engine assemblies with each other, a gas line that connects the turbine of the turbopump assembly to the combustion chamber, units for fastening the LRE to a launcher so as to make it capable of turning (swinging) in a vertical plane.

A disadvantage of this prior art LRE design consists in that it can ensure turning (swinging) of the LRD, as required for changing its thrust vector direction, only in a single plane. It should be also pointed out that large size of the bellows balances used in this prior art design leads to an increased axial overall dimension of the engine.

These disadvantages of the prior art design also exist in the design of a dual-chamber LRE which also has a considerable axial overall dimension. The above disadvantages prevent the production of a launcher having smaller mass and overall dimensions.

Also known in the art is an F-1 LRE designed by Rocketdyne Co. of the U.S.A. (see in the book: TsIAM, "Foreign Aircraft and Rocket Engines", 1971, pp. 436–439). This LRE comprises a combustion chamber, a gas generator, a turbopump assembly, automatic equipment, inner pipelines of the engine, and a gimbal assembly.

As applied to a dual-chamber engine design, this prior art design requires the development of a special frame. In a number of cases, it is also difficult to ensure smaller axial overall dimensions for this engine and, hence, to optimize the launcher as far as its overall dimensions and mass are concerned.

The closest to the liquid-propellant rocket engine of the present invention is an LRE under code name RD-219 designed by NPO Energomash (see in the encyclopaedia: "Cosmonautics", Editor-in-Chief V. P. Glushko, Moscow, 1985, p. 330). This prior art liquid-propellant rocket engine comprises two combustion chambers fixed to a frame, a turbopump assembly fastened also to the frame and having a turbine, oxidizer and fuel pumps, and pipes for feeding the oxidizer and fuel to a gas generator and to the combustion chamber of the engine.

A limitation of this prior art design consists in that the engine chambers are rigidly fixed to the frame. They cannot turn so as to change the thrust vector direction and, in a number of cases, they require to provide special control spaces on board the launcher. Besides, this engine has no pipe between the turbine and the combustion chambers so that gas is exhausted from the gas generator overboard, instead of contributing to an increase in the specific thrust developed by the rocket engine as the case is for a system with gas from the gas generator being afterburned. If this engine is made with "swinging" combustion chambers using the system for afterburning the gas, then both the axial and diametric overall dimensions of the design will become larger.

SUMMARY OF THE INVENTION

The principal object of the present invention is to provide an LRE design which ensures a reduction in the overall axial dimension of the engine as well as in the overall axial dimension and mass of the launcher. Another object is an improvement in the use of the engine compartment space of the rocket by the LRE components and assemblies which are to be received therein. Still another object is to simplify the process of assembling the engine.

The necessity for arranging the components more compactly becomes particularly pressing in those instances when it is required to update obsolete launchers by equipping them with advanced modern rocket engines.

The essence of the invention consists in that in the prior art liquid-propellant rocket engine comprising two combustion chambers fixed to a frame, a turbopump assembly also fastened to the frame and having a turbine, oxidizer and fuel pumps, and pipes for feeding the oxidizer and fuel to a gas generator and to the combustion chambers of the engine, said frame is made demountable and comprises two sections disposed symmetrically relative to the engine axis, said frame is provided with supports for taking up forces from said rocket engine and with footpads for fastening said frame to the rocket body, said footpads and said supports being located in the planes perpendicular to the longitudinal axis of said rocket engine, the footpad location plane being located between the support location plane and the rocket body, wherein a branched curved pipe is incorporated therein additionally for feeding high-temperature oxidizing gas from the turbine outlet to the combustion chambers of the engine and having the unbranched end passage thereof connected to the turbine outlet and having the two branches thereof connected to two sections of the frame disposed symmetrically relative to the engine axis, and wherein said two branches of the branched curved pipe are connected to said combustion chambers through corresponding bellows balances, each being a swinging unit for its corresponding combustion chamber, and each of the pipes for feeding the fuel to said combustion chambers of the engine comprises two bellows balances.

In addition, said bellows balances of the pipes for feeding the fuel to said combustion chambers are made so as to be capable of compensating for the angular displacements of said pipes in two mutually perpendicular planes which are parallel to the axis of the liquid-propellant rocket engine.

Besides, the frame sections are made of rods welded together and they are fastened to each other by a plane rod joint.

Furthermore, said plane rod joint is shaped as a spider, and hollow rods are used as said rods.

Moreover, each of said bellows balances of the pipes for feeding the fuel to said combustion chambers of the engine is provided with a cardan mechanism.

Also, the bellows balances which are the swinging units for the combustion chambers are provided with appropriate cardan mechanisms.

Further, said branched curved pipe for feeding high-temperature oxidizing gas has the two branches thereof connected to the two sections of the frame disposed symmetrically relative to the engine axis by means of attachment units.

Besides, each of said attachment units comprises two trunnions inserted into bearing units of said supports for taking up forces from said rocket engine.

In addition, said support for taking up forces from said rocket engine is made on said frame in the form of a cross-arm.

As follows from the abovesaid, the LRE comprises two combustion chambers, a gas generator, a turbopump assembly, and engine pipelines communicating the corresponding engine assemblies with each other. The LRE also comprises a frame having footpads and supports located in different planes perpendicular to the engine axis and made up of at least two welded rod sections fastened to each other by a plane rod joint. Bellows balances or flexible hoses are mounted in the inner pipelines of the LRE which feed the fuel to the combustion chambers of the engine, said bellows balances or flexible hoses having their movable ends connected directly to the combustion chambers or to the pipes joined thereto. Here, those ends of the bellows balances or flexible hoses, which are moving together with the combustion chambers during their swinging motion relative to the rocket body, are considered to be the movable ends.

The frame has footpads and supports located in different planes perpendicular to the engine axis. The frame is made as a compensation frame due to the location of the footpad plane between the plane of supports and the rocket body. It is important that the frame is made demountable, for instance, due to the use of threaded connections to fasten the frame sections and the plane rod joint.

Because of such a design, the frame parts may be temporarily disconnected in the process of assembling the engine or fixed to the frame only after some other corresponding assemblies and components are mounted to the engine, thus simplifying the process of assembling to the engine.

In an embodiment of the invention for an LRE with a system for afterburning the generator gas, a branched curved pipe for feeding high-temperature oxidizing gas is disposed between the turbine of the turbopump assembly and the combustion chambers to communicate their inner spaces with each other. The branched ends of the pipe, i.e., its elbows, are connected each to its respective bellows balance provided with a cardan joint and fixed to the frame, and at its unbranched end the branched curved pipe for feeding high-temperature oxidizing gas is gas-tightly connected to the turbopump assembly.

Such a design makes it possible to reduce the mass of the frame and is favourable for optimizing both the mass and the overall axial dimension of the engine.

According to the present invention, the LRE has, in addition to said branched pipe, also other pipes connected to the combustion chamber, each comprising two bellows balances located one after another. Each of such bellows is made so as to compensate for the movement of the pipe ends in their plane. For each pipe, these planes are mutually perpendicular to each other and extend along the LRE axis. Such an embodiment of the pipes connected to the combustion chambers allows to turn (swing) only the combustion chambers alone relative to the launcher, while maintaining the stationary position of the turbopump assembly, gas generator, frame and other assemblies and components of the LRE. This allows to reduce the "swinging" inertial masses of the engine, i.e., to reduce the mass and power of the survo units as well as the mass of the engine as a whole.

In another embodiment of the invention, the plane rod joint of the frame may be made in the form of a spider welded of hollow metal rods. This makes it possible to reduce the height of the frame, i.e., to ensure a reduction in the mass and overall dimensions for the rocket tail section as a whole with the structural particularities of the engine maintained as required.

The invention will now be described by way of an example with reference to the accompanying drawings which show a specific embodiment thereof.

BRIEF DESCRIPTION OF THE DRAWINGS

In accordance with observations, a new amended set of accompanying drawings has been prepared, in which.

DESCRIPTION OF THE PREFERRED EMBODIMENT

Figure 1:
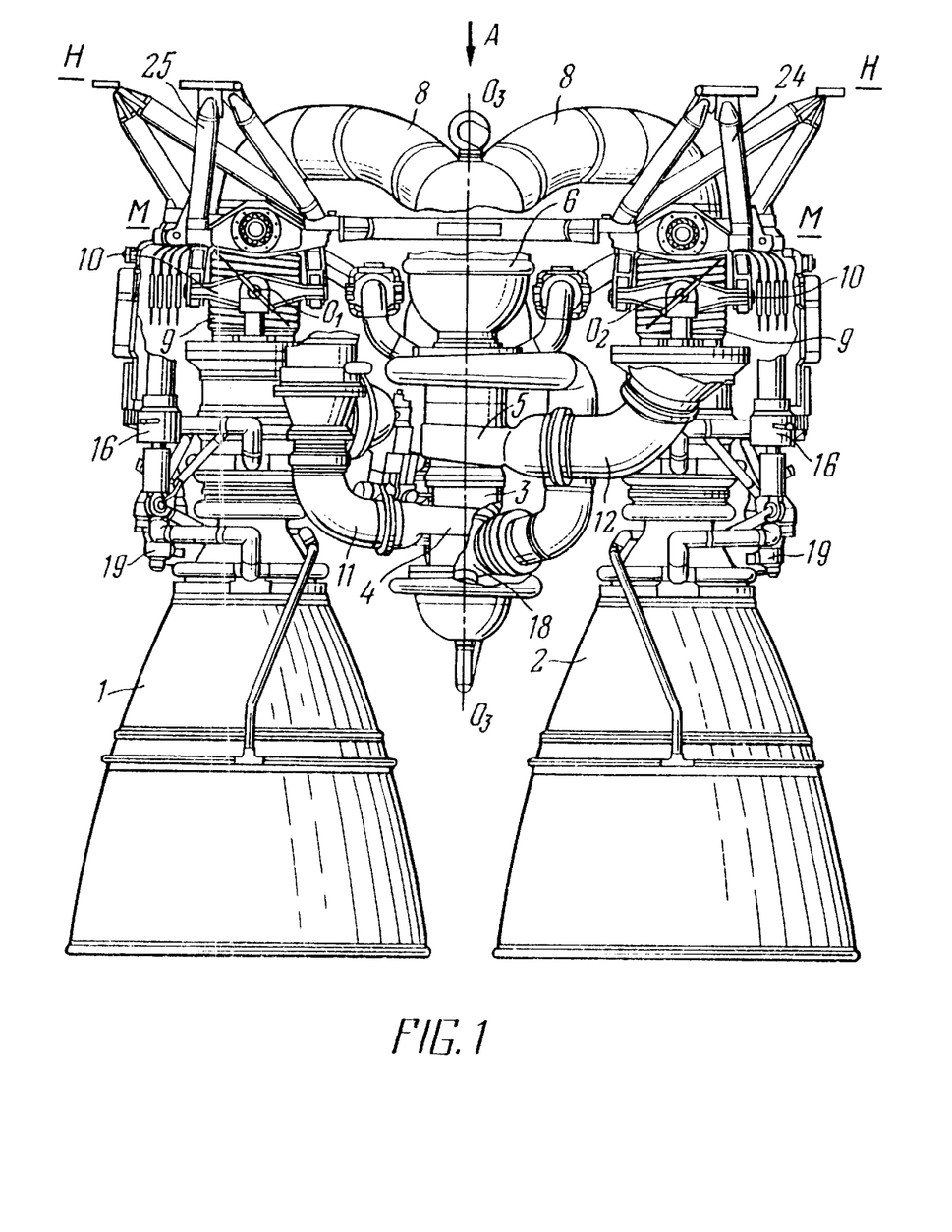
FIG. 1 shows a general view of the LRE.
Figure 2:
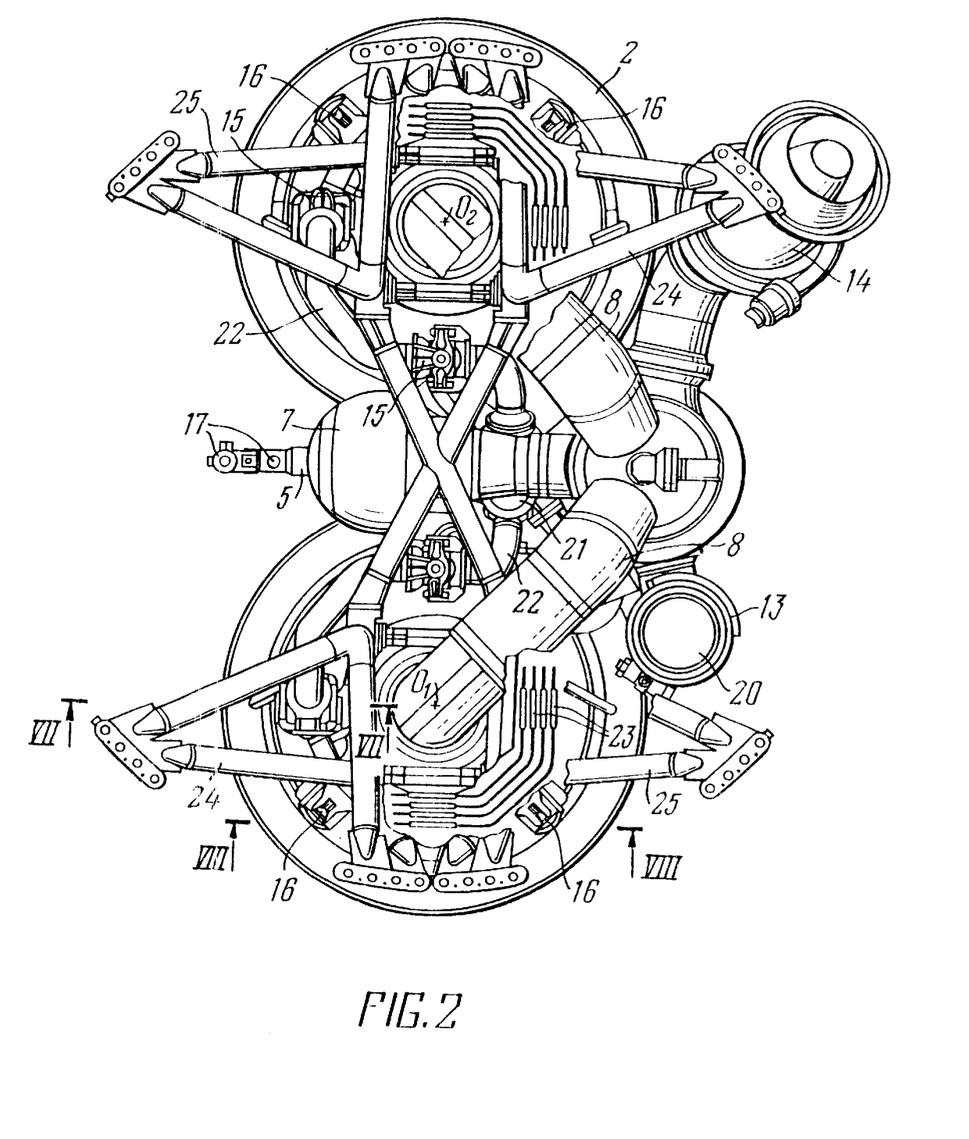
FIG. 2 is view A of FIG. 1 turned through 90° counter-clockwise.

The proposed LRE is shown in FIGS. 1 and 2 where a first combustion chamber of the LRE is at 1, and a second combustion chamber of the LRE is at 2. The chambers 1 and 2 are of the same design. A turbopump assembly is shown at 3 and it comprises a fuel pump 4, an oxidizer pump 5 and a turbine 6. The turbine 6 has an inlet thereof communicated hydraulically with a gas generator 7 (FIG. 2), and an outlet of the turbine 6 is connected to the combustion chambers 1 and 2 by means of a branched curved pipe 8 for high-temperature oxidizing gas (FIGS. 1 and 2). The outlets of this pipe 8 are provided with bellows balances 9 (FIG. 1), one for each combustion chamber 1 and 2, having their own cardan mechanisms 10. The center of the cardan mechanism 10 for the combustion chamber 1 is located at point $0_1$, and the center of the cardan mechanism 10 for the combustion chamber 2 is located at point $0_2$ (FIGS. 1 and 2).

The engine has a main pipe 11 for feeding fuel (FIG. 1) connected at its one end to a fuel booster pump assembly 13 (FIG. 2) and at its other end to an inlet of the fuel pump 4, and a pipe 12 for feeding oxidizer (FIG. 1) connected at its one end to an oxidizer booster pump assembly 14 (FIG. 2) and at its other end to an inlet of the oxidizer pump 5.

An outlet of the fuel pump 4 is connected through a controllable fuel orifice 21 and pipes 22, each being provided with two bellows balances 15, to starting/cut-off valves 19 mounted to the combustion chambers 1 and 2, respectively. And, the bellows balances 15 are located in the plane of swinging the combustion chambers 1 and 2, their axes being orthogonal to each other and extending along the swinging axes of the combustion chambers.

The combustion chambers 1 and 2 each has two hydraulic drives 16 for control surfaces (FIGS. 1 and 2) having each its rod hinged to a respective one of the combustion chambers 1 and 2. The hydraulic drives 16 provide for angular rotation of the combustion chambers 1 and 2 about the axes extending through the centers $0_1$ and $0_2$ of the cardan mechanisms 10, each in its respective plane. The planes in which the combustion chambers 1 and 2 can be rotated by the hydraulic drives 16, are mutually perpendicular. The maximum deviation of the axis of the combustion chamber 1 or 2 from the nominal position may reach as much as 8°. Since the engine is designed for non-hypergolic fuel components, it is provided with two ampoules 17 with starting fuel.

The engine is provided with the following automatic devices: an oxidizer cut-off valve 18 mounted at an inlet to the gas generator 7 as well as two cut-off valves 19 mounted to the combustion chambers 1 and 2 (FIG. 1).

Besides, the engine (FIG. 2) has a fuel flow-ratio valve 20 mounted in the pipe 11 for feeding fuel to the fuel pump 13.

The engine also comprises pipes with flexible metal noses 23 (FIG. 2) for blowing the engine through and for controlling the valves.

The engine may also be provided with some other automatic devices. In many cases, it is advisable to use flow meters. Various procedures can be used to control the engine, depending in particular, on the fuel components being used and on the technical requirements to the engine.

The bottom bases of the bellows balances 9 (FIG. 1) are fixed to the combustion chambers 1 and 2, and their top bases are fixed to the branched pipe which is hinged to the frame.

The frame is designed for mounting stationarily the engine to a rocket body and for transmitting the thrust force to the rocket body. The frame consists of two symmetric sections 24 and 25, each in turn consisting of two symmetric parts which are actually quarters of the frame.

Figure 5:
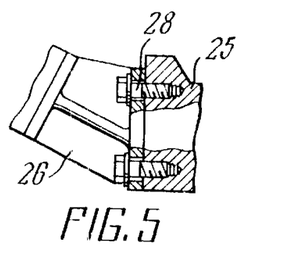
FIG. 5 shows region I (see FIG. 4) of a detachable joint connecting a section of the frame to a spider.

The frame has a spider 26 and four spacers 27. The quarters of the frame are made by welding. In each section 24 and 25, the quarters of the frame are detachably jointed together through the spacers 27 and the spider 26. The spider 26 joints detachably the sections 24 and 25 per se and to each other. The detachable joints in the frame between the sections of the frame and the spider 26 are shown in FIG. 5. The parts are jointed together by means of washers and bolts 28.

Figure 6:
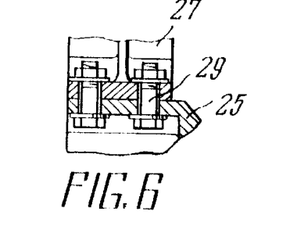
FIG. 6 shows region II (see FIG. 4) of a detachable joint connecting a section of the frame to a spacer.

The quarters of the frame are assembled into its sections 24 and 25 through the spacers with the use of nuts, washers and bolts 29, as shown in FIG. 6.

The detachable frame construction provides for the possibility of assembling its separate members to the engine after its mounting is completed, including also the case when the engine is mounted with the frame assembled only partly, as well as of other assembly units and components of the LRE and in particular, those located in the inner space of the frame, which is inaccessible for making some assembling operations there with the frame assembled completely.

Figure 3:
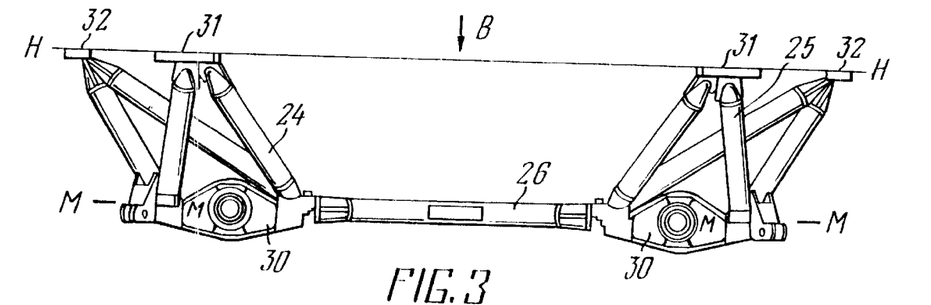
FIG. 3 shows a frame of the LRE.

The plane of footpads 31 and 32 extends through the plane adjoining the rocket body as designated by H—H in FIG. 1 and FIG. 3. The mounting points are defined for the branched pipe 8 by holes in cross-arms 30 of the frame (FIG. 3). The location of these holes defines the position of the plane of supports, which is characterized conditionally by a plane extending through the centers of these holes and being parallel to the plane of footpads 31 and 32. This plane is designated by M—M in FIG. 1 and FIG. 3. The plane of footpads extends above the plane of supports, and thus the frame is actually a compensation frame.

Figure 4:
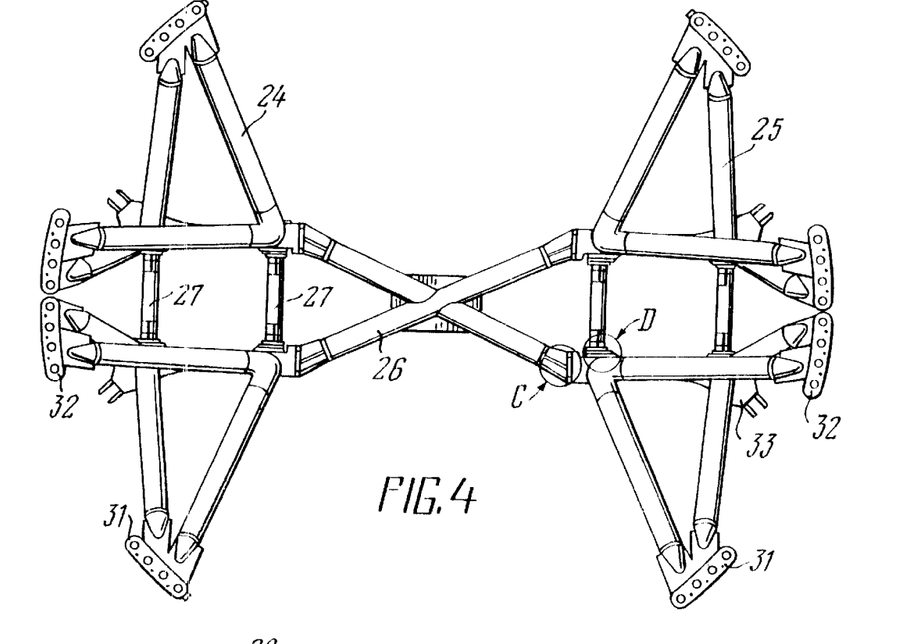
FIG. 4 is view B (see FIG. 3) of the LRE frame.

The frame has also four brackets 33 (FIG. 4) to which the drive 16 (FIG. 2) for control surfaces are attached.

In order to improve stiffness of the frame structure, instead of the spider 26, use can be made of a rectangular tetragon welded of tubes and having, for instance, a diagonal.

The pipes 22 for feeding fuel to the combustion chambers are provided each with two bellows balances 15 (FIG. 2). These balances are similar in their design to the bellows balances 9 (FIG. 1) that feed oxidizing gas to the combustion chambers 1 and 2.

Figure 7:
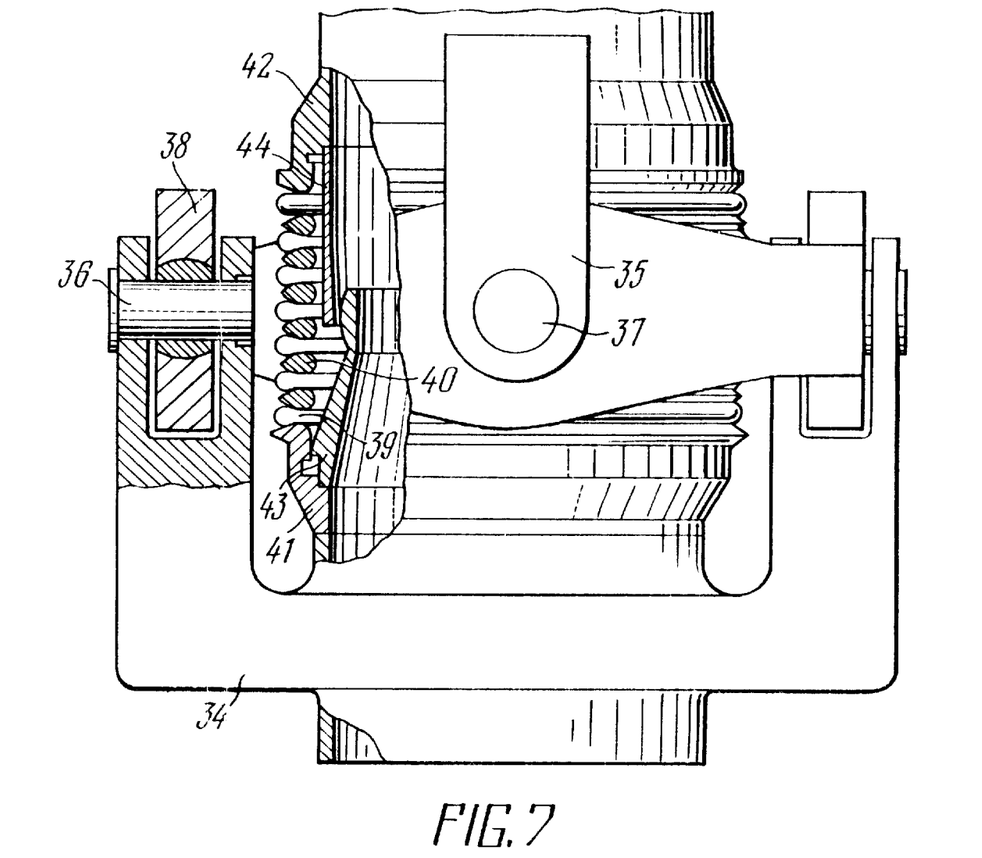
FIG. 7 shows a bellows balance as viewed in section VII—VII of FIG. 2.

A cross-section through the fuel bellows balance 15 with its cardan mechanism is presented in FIG. 7 (section VII—VII of FIG. 2), where yokes of the cardan mechanism are at 34 and 35, pins of the cardan mechanism are at 36 and 37, cardan frame is at 38, bellows is at 39, armoring rings inserted into corrugation grooves of the bellows 39 are at 40, bases welded gas-tightly to the ends of the bellows 39 are at 41 and 42, and branch pipes that straighten the flow and are fixed to the base 41 and 42 are at 43 and 44, respectively.

Figure 8:
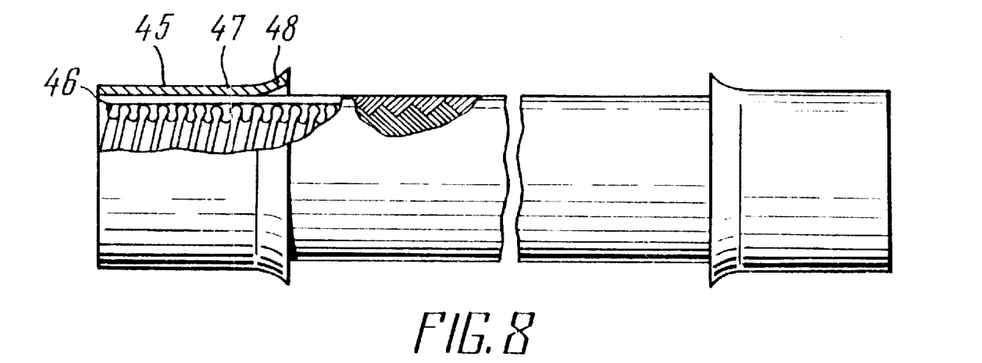
FIG. 8 shows a flexible metal hose for high-pressure gas pipes (used for controlling and blowing-through) as viewed in section VIII—VIII of FIG. 2.

The automatic equipment control pipelines with valves 18 and 19 (FIG. 1) as well as the blowing-through pipelines for blowing the spaces of the combustion chambers 1, 2 of the gas generator 7 are provided with flexible metal hoses 23 (FIG. 2) shown in FIG. 8. Each of such flexible hoses 23 consists of a bellows tube 45, a reinforcement winding 46 made of wire, a metal braiding 47 and two support sleeves 43. Each pipeline is provided with two hoses of such type. Control and blow-through gas may be fed from high-pressure tanks mounted to the engine or to the rocket and which are not shown in the accompanying drawings of this patent application.

Figure 9:
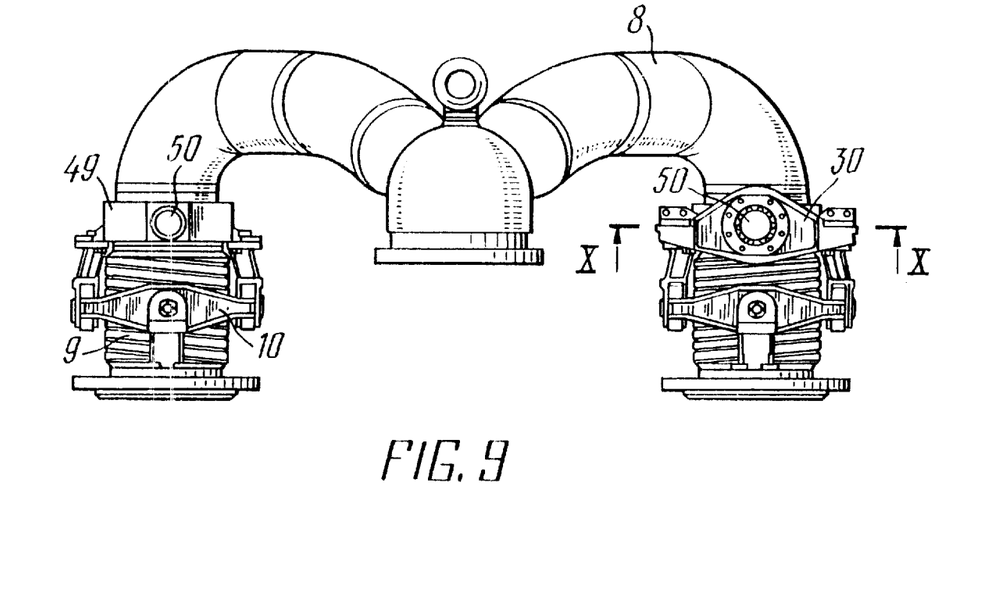
FIG. 9 shows a branched curved pipe for high-temperature oxidizing gas having a hinged attachment to the frame and a cardan-type bellows balance.
Figure 10:
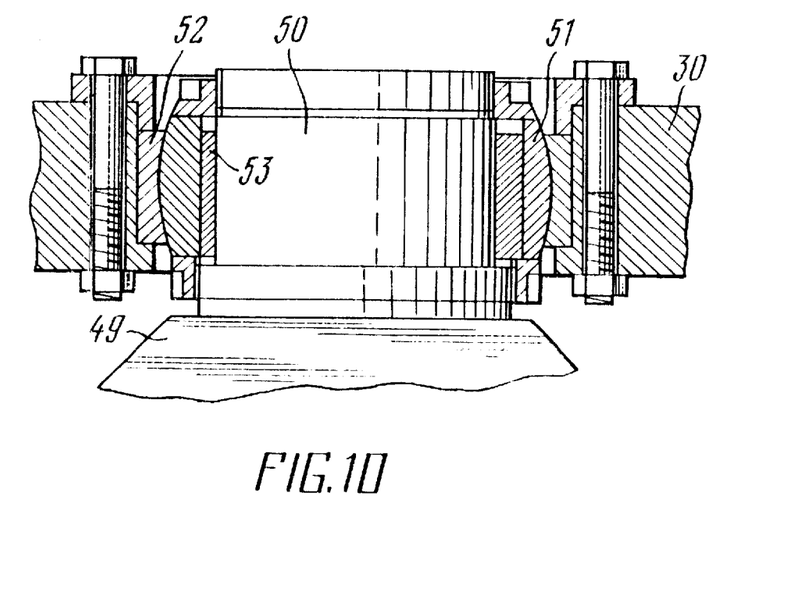
FIG. 10 shows section X—X of FIG. 9 through the hinged attachment of the pipe to the frame.

The unit used for fixing the curved pipe to the frame is shown in FIG. 9 and 10. FIG. 9 illustrates the curved pipe 8, wherein the left elbow of the curved pipe is shown without a cross-arm for clarity. Each end of the branched curved pipe 8 for high-temperature oxidizing gas is provided with a structural ring 49 (FIG. 10) and a trunnion 50. Ball plain bearings are placed on the trunnion 50, each of the bearings having an inner ring 51 which is an eccentric ring, and an outer ring 52. The trunnion 50 is seated in its bearing through a sleeve 53 which also has an eccentricity. Such an attachment of the curved pipe in the trunnions allows to compensate for misalignment of the structures being joined.

The proposed liquid-propellant engine made in accordance with the present invention operates as follows. When in its initial and transportation positions, the turbopump assembly 3 and the gas generator 7 are suspended from the curved branched pipe 8 fastened to the frame sections 24 and 25. The turbine 6 is secured in a gas-tight manner to the inlet portion of this pipe 8. Each of the combustion chambers 1 and 2 is fixed to its bellows balance 9 and its cardan mechanism 10. The inlets of the bellows balances 9 are attached in a gas-tight manner to the outlet ends of the pipe 8, which are connected by means of axial hinges to the cross-arms 30 of the framed (24, 25). Thus, the weight of the combustion chambers 1 and 2 is transmitted to the frame (24, 25).

In accordance with the starting procedure, starting fuel is fed from the ampoules 17 to the gas generator 7 and to the combustion chambers 1 and 2 whereto oxidizer and liquid oxygen are fed as well so that the engine gets started and kerosene begins to be fed to the combustion chambers 1 and 2 as well as to the gas generator 7 of fuel. As a result, both the turbopump assembly 3 and the entire LRE as a whole will reach the rated speed and the rated operation mode.

The thrust developed by the combustion chambers 1 and 2 is summed up with the engine weight and the force resulting from pressure in the pipe 8, all being transmitted to the cross-arms 30 of the frame sections 24 and 25. These forces are then transmitted through the frame and its footpads 31 and 32 to the rocket. In order to prevent the frame against excessive deformation while the LRE is in operation, the sections 24 and 25 are fastened to one another through a plane rod joint welded of tubes so as to form the spider 26. This spider 26 (FIGS. 3 and 4) makes the frame structure stiffer. Owing to the fact that the turbopump assembly is suspended from the branched pipe, the frame may be made lighter, and this means that the mass of both the LRE and the entire rocket as a whole will decrease.

If it is necessary to deflect the combustion chambers 1 and 2 (FIGS. 1 and 2) from their nominal angular position, the drives 16 for control surfaces are brought in operation. The combustion chamber 1 and/or 2 are deflected due to being rotated about center $0_1$ and/or $0_2$ of its bellows balance 9 with the cardan 10. Every time this happens the pipes 22 for feeding fuel to the combustion chambers 1 and/or 2 will change their positions in space correspondingly due to the fact that the angular displacements are compensated for by the cardan-type bellows balances 15. When this occurs, the flexible metal hoses 23 will also change their positions in two mutually perpendicular planes in conformity with the change in the positions of their respective pipes.

The engine thrust is taken up by supports which have their role played by the cross-arms 30 (FIGS. 9 and 10) provided in the frame, through the trunnions 50 and the rings 51 and 52 of the ball bearings.

With the engine being in operation, high-temperature oxidizing gas is flowing over the branched curved pipe 8 under high pressure. As a result, the pipe 8 gets distorted. The hinge consisting of the trunnion 50, rings 51 and 52 of the plain bearings and fastened to the cross-arms 30 of the frame as well as the gas-tight jointing of the structural ring 49 of the pipe 9 to the bellows balance 9 make it possible for the outlet ends of the branched pipe 8 to rotate angularly on the trunnions 50 and eliminates its rotation together with the cross-arm 30.

This allows to reduce substantially the stress in the pipe 8 which is a critical component of the engine as far as its strength is concerned, and also allows to reduce the mass of the pipe 8.

When the engine is being shut down, pressure of the fuel components is released in the pipelines as a result of shutting down the turbopump unit 3 and decaying the processes in the combustion chambers 1 and 2 and in the gas generator 7.

Industrial Applicability

The presently claimed liquid-propellant rocket engine can be used most successfully in rocketry.

What is claimed is:

1. A liquid-propellant rocket engine comprising two combustion chambers fixed to a frame, a turbopump assembly also fastened to the frame and having a turbine, oxidizer and fuel pumps, and pipes for feeding oxidizer and fuel to a gas generator and to the combustion chambers of the engine, wherein said frame is made demountable and comprises two sections disposed symmetrically relative to the engine axis, said frame is provided with supports for taking up forces from said rocket engine and with footpads for fastening said frame to the rocket body, said footpads and said supports being located in the planes perpendicular to the longitudinal axis of said rocket engine, the footpad location plane being located between the support location plane and the rocket body, wherein a branched curved pipe is incorporated therein additionally for feeding high-temperature oxidizing gas from the turbine outlet to the combustion chambers of the engine and having the unbranched end passage thereof connected to the turbine outlet and having the two branches thereof connected to the two sections of said frame that are disposed symmetrically relative to the engine axis, and wherein said two branches of the branched curved pipe are connected to said combustion chambers through corresponding bellows balances, each being a swinging unit for its corresponding combustion chamber, and each of the pipes for feeding the fuel to said combustion chambers of the engine comprises two bellows balances.

2. The liquid-propellant rocket engine as set forth in claim 1, wherein said bellow balances of the pipes for feeding the fuel to said combustion chambers are made so as to be capable of compensating for the angular displacements of said pipes in mutually perpendicular planes which are parallel to the axis of said liquid-propellant rocket engine.

3. The liquid-propellant rocket engine as set forth in claim 1, wherein said frame sections are made of rods welded together, and wherein said frame sections are fastened to each other by a plane rod joint.

4. The liquid-propellant rocket engine as set forth in claim 3, wherein said plane rod joint is shaped as a spider, and wherein said rods are hollow rods.

5. The liquid-propellant rocket engine as set forth in claim 2, wherein each of said bellows balances of said pipes for feeding the fuel to said combustion chambers of the engine is provided with a cardan mechanism.

6. The liquid-propellant rocket engine as set forth in claim 1, wherein said bellows balances which are the swinging units for said combustion chambers, are provided with appropriate cardan mechanisms.

7. The liquid-propellant rocket engine as set forth in claim 1, wherein said branched curved pipe for feeding high-temperature oxidizing gas has said two branches thereof connected to said two sections of said frame that are disposed symmetrically relative to the engine axis by means of attachment units.

8. The liquid-propellant rocket engine as set forth in claim 7, wherein each of said attachment units comprises two trunnions inserted into bearing units of said supports for taking up forces from said rocket engine.

9. The liquid-propellant rocket engine as set forth in claim 7, wherein said support for taking up forces from said rocket engine is made on said frame in the form of a cross-arm.

10. The liquid-propellant rocket engine as set forth in claim 8, wherein said bearing unit is made in the form of a plain ball bearing.

* * * * *

UNITED STATES PATENT AND TRADEMARK OFFICE
CERTIFICATE OF CORRECTION

PATENT NO. : 6,170,258 B1
DATED : January 9, 2001
INVENTOR(S) : Boris Ivanovich Katorgin et al.

Page 1 of 1

It is certified that error appears in the above-identified patent and that said Letters Patent is hereby corrected as shown below:

<u>Title page,</u>
Item [75] Inventors, line 3, "Lliich" has been replaced with -- Iliich --.
Item [73] Assignees, lines 5 and 6, "Moskovskaya Oblast Moskovskaya Oblast" has been deleted.

Signed and Sealed this

Second Day of April, 2002

Attest:

Attesting Officer

JAMES E. ROGAN
*Director of the United States Patent and Trademark Office*